Figure 1:
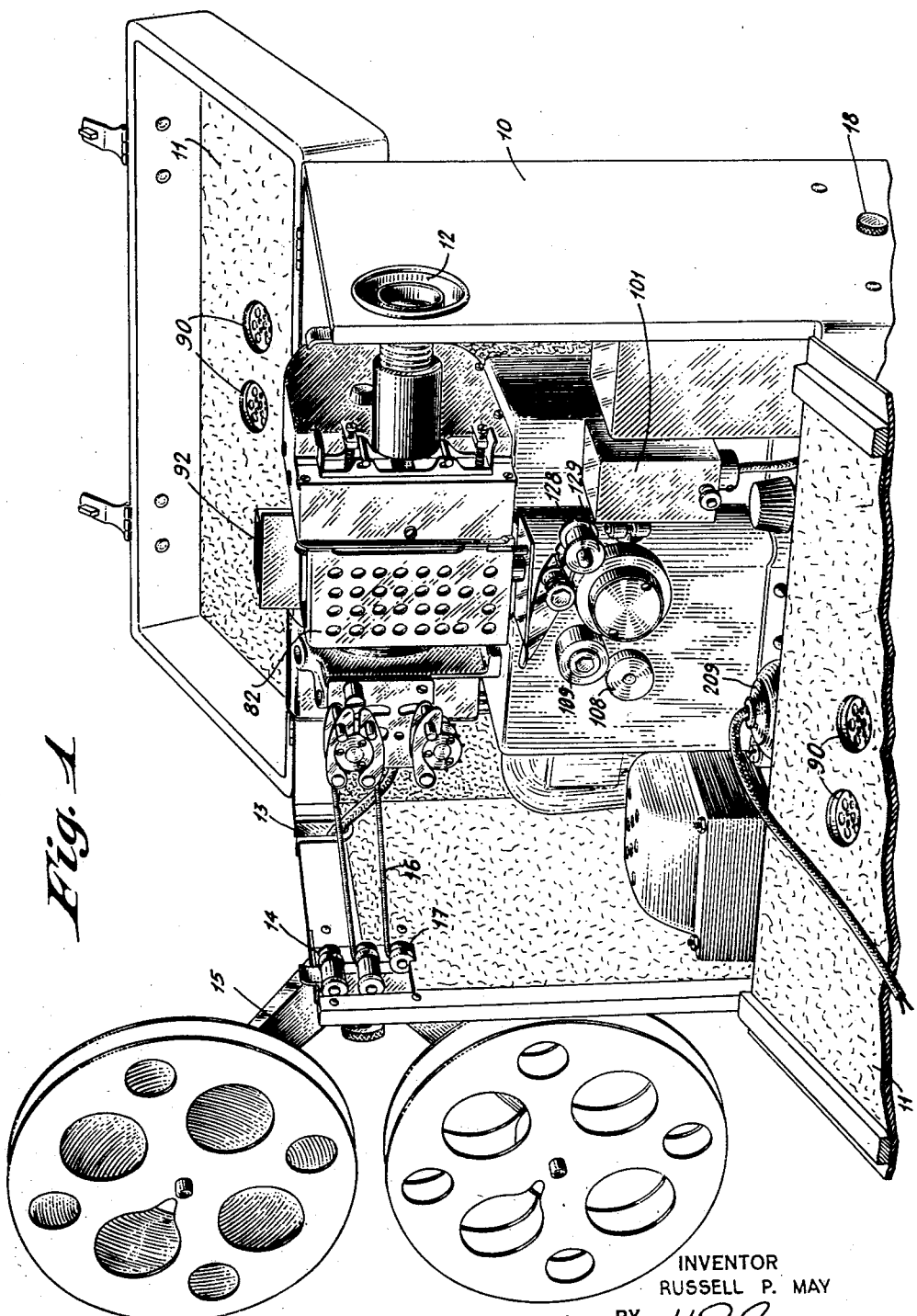

June 4, 1935.  R. P. MAY  2,003,381
PORTABLE TALKING MOTION PICTURE APPARATUS
Filed Nov. 3, 1931  15 Sheets-Sheet 1

INVENTOR
RUSSELL P. MAY
BY
ATTORNEY

June 4, 1935.   R. P. MAY   2,003,381
PORTABLE TALKING MOTION PICTURE APPARATUS
Filed Nov. 3, 1931   15 Sheets-Sheet 6

INVENTOR
RUSSELL P. MAY
BY
ATTORNEY

June 4, 1935.  R. P. MAY  2,003,381
PORTABLE TALKING MOTION PICTURE APPARATUS
Filed Nov. 3, 1931   15 Sheets-Sheet 8

INVENTOR
RUSSELL P. MAY.
BY
ATTORNEY

June 4, 1935.  R. P. MAY  2,003,381
PORTABLE TALKING MOTION PICTURE APPARATUS
Filed Nov. 3, 1931  15 Sheets-Sheet 10

INVENTOR
RUSSELL P. MAY
BY H. S. Grover
ATTORNEY

June 4, 1935.   R. P. MAY   2,003,381
PORTABLE TALKING MOTION PICTURE APPARATUS
Filed Nov. 3, 1931   15 Sheets-Sheet 11
*Fig. 15*
*Fig. 12*
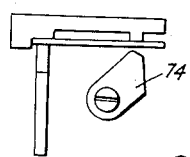
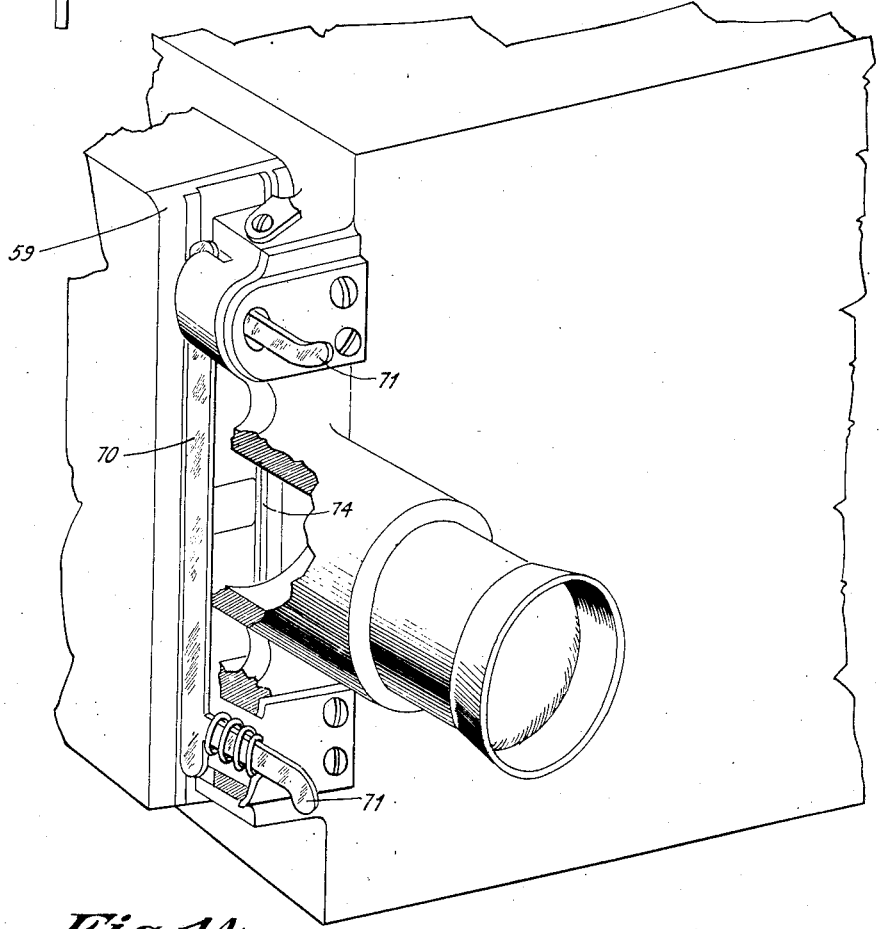
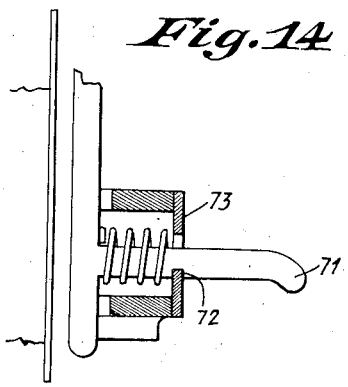
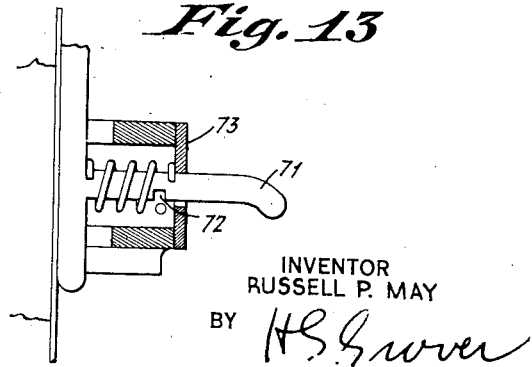
*Fig. 14*
*Fig. 13*
INVENTOR
RUSSELL P. MAY
BY
ATTORNEY June 4, 1935.  R. P. MAY  2,003,381
PORTABLE TALKING MOTION PICTURE APPARATUS
Filed Nov. 3, 1931  15 Sheets-Sheet 12

INVENTOR
RUSSELL P. MAY
BY *H.S. Grover*
ATTORNEY

June 4, 1935.  R. P. MAY  2,003,381
PORTABLE TALKING MOTION PICTURE APPARATUS
Filed Nov. 3, 1931   15 Sheets-Sheet 15

INVENTOR
RUSSELL P. MAY
BY H. T. Grover
ATTORNEY

Patented June 4, 1935

2,003,381

UNITED STATES PATENT OFFICE 2,003,381

PORTABLE TALKING MOTION PICTURE APPARATUS

Russell P. May, Woodbury, N. J., assignor to Radio Corporation of America, a corporation of Delaware Application November 3, 1931, Serial No. 572,804

8 Claims. (Cl. 88—16.2)

The present invention relates to portable talking motion picture apparatus particularly adapted to home and educational use. It involves the provision of an improved projector, an improved sound reproducer and an improved amplifier, all built into a single, light-weight, inexpensive unit fitted within a sound-proof carrying case. Other novel features are a loudspeaker adapted to be fitted within a similar carrying case which can retain the extra reels of film, etc., and the improved arrangement of the various parts.

One object of the invention is to provide an improved talking motion picture apparatus adapted to use 16 mm. film which carries thereon a sound-track of one of the usual types in commercial use.

Another object of the invention is to provide such an apparatus which is capable of high quality sound reproduction from such a film.

Another object of the invention is to provide such an apparatus which requires a minimum power to operate it and which can therefore be operated from any ordinary household power supply.

Another object of the invention is to provide an extremely compact and rugged combination of motion picture projector, sound reproducer and amplifier.

Another object of the invention is to provide a motion picture projector mechanism which is built into a unitary structure with the driving motor.

Another object of the invention is to provide a sound reproducer which requires no individual or separate drive mechanism.

Another object of the invention is to provide a photocell and amplifier structure which is adequately shielded both mechanically and electrically by the remainder of the construction of the soundhead.

Another object of the invention is to provide a projector which is so sound-proof as to require no projection booth or the equivalent for its operation, and thereby permit its operation in any desired location such as the midst of the audience.

Another object of the invention is to provide a new method of and aparatus for driving the film past the sound reproduction point in order to avoid irregularities of the motion thereof.

Another object of the invention is to provide such a relation between the power supply of the amplifier and the loudspeaker as to prevent voltage surges in the amplifier and filter circuits if the switch is inadvertently turned on when the loudspeaker is disconnected.

Another object of the invention is the provision of an improved film gate which permits the film to be driven from one row of sprocket holes only without flicker at the aperture and without the film tending to run off to one side or the other.

Another object of the invention is the provision of a carrying case for the projector adapted to permit operation of the projector therein and provided with appropriate facilities for ventilation, replacement of amplifier tubes, and the admission and exit of the film and the necessary wires.

Figure 2:
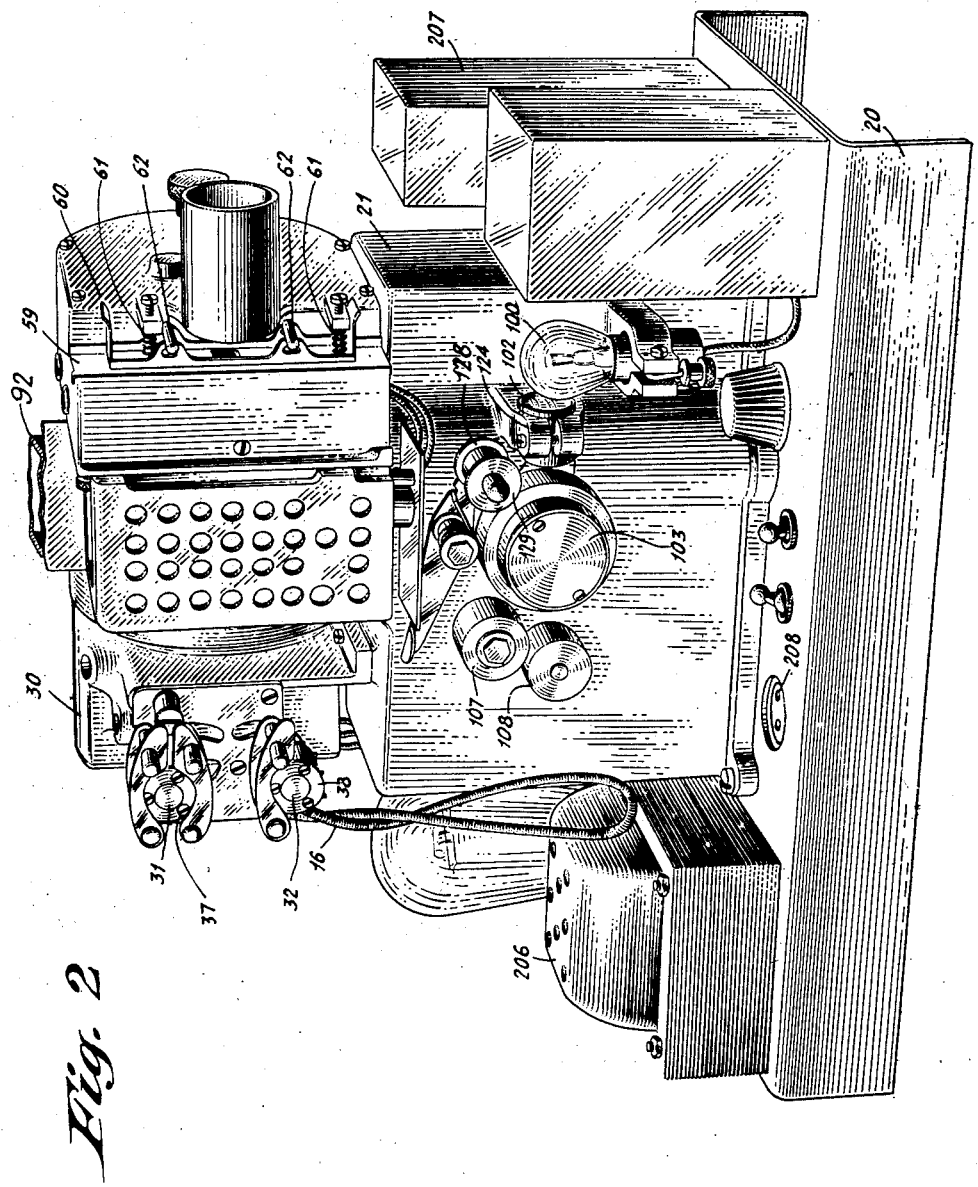
Figure 3:
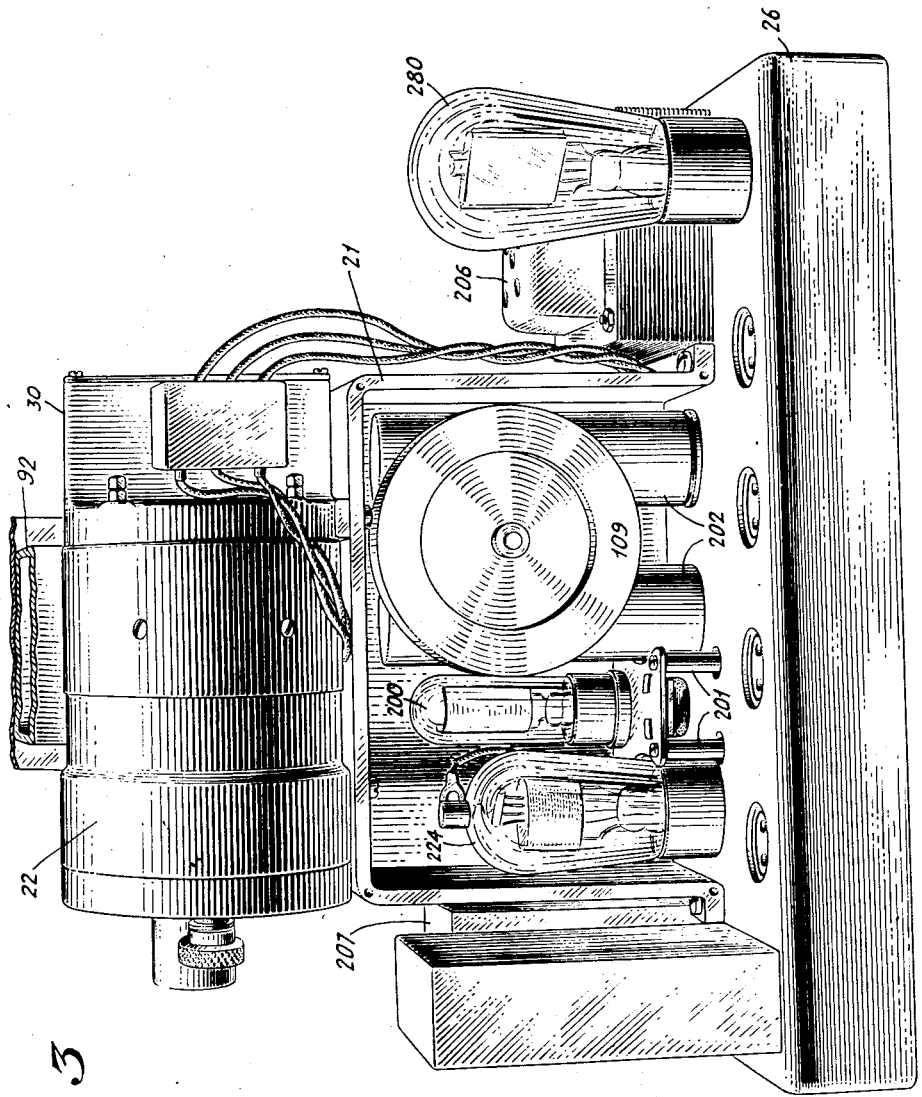

Other and ancillary objects of the invention will be apparent from a reading of the following specification in connection with the accompanying drawings and its scope will be pointed out in the appended drawings wherein:

Referring to the drawings:

Fig. 1 is a side view of the projector as mounted in the carrying case and with the carrying case open for threading of the projector, Fig. 2 is a similar view of the projector and associated parts removed from the carrying case, Fig. 3 is a view of the opposite side of the projector with the amplifier and rectifier tubes removed and with the cover removed from the photocell housing.

Figure 4:
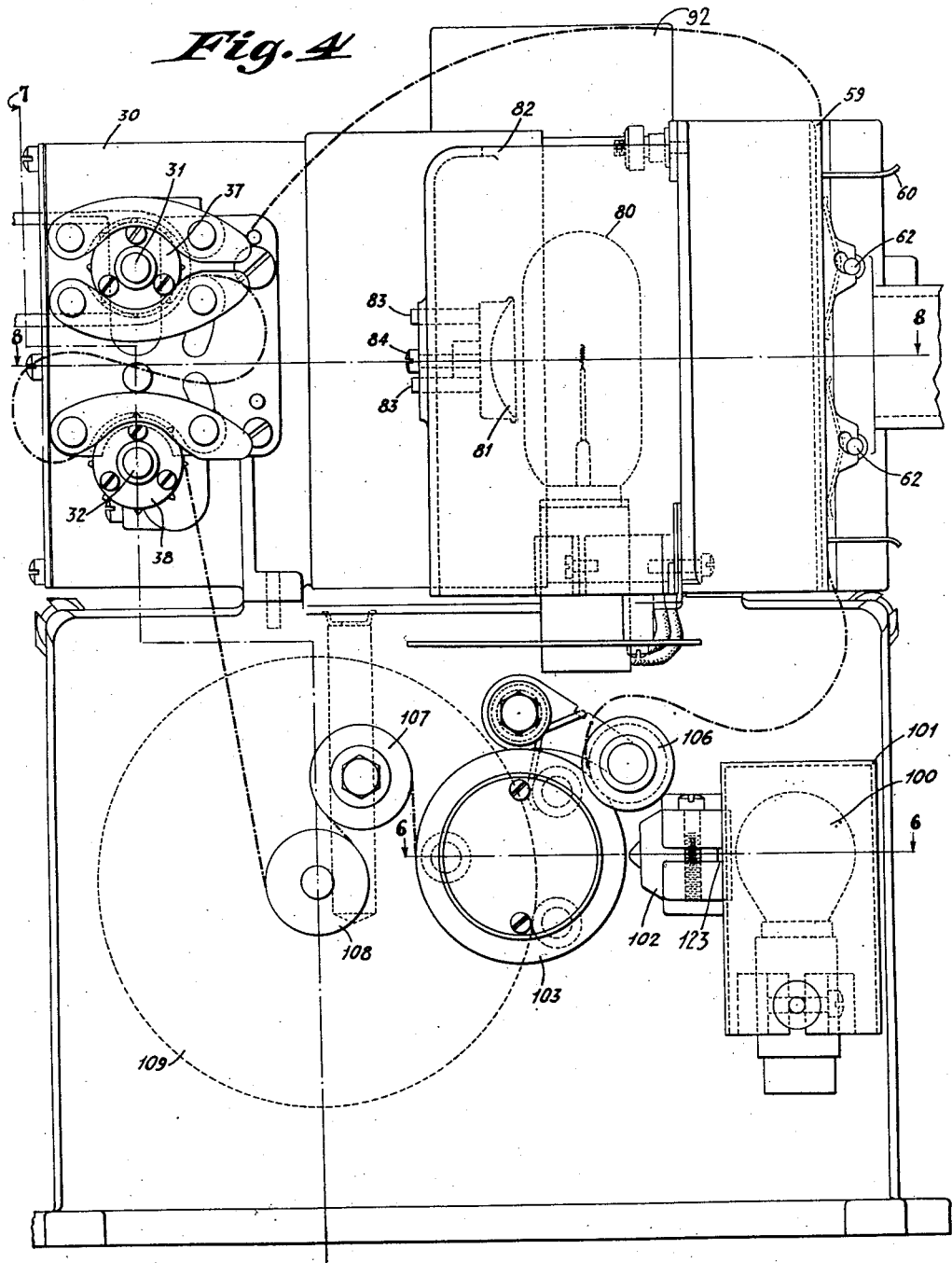
Figure 5:
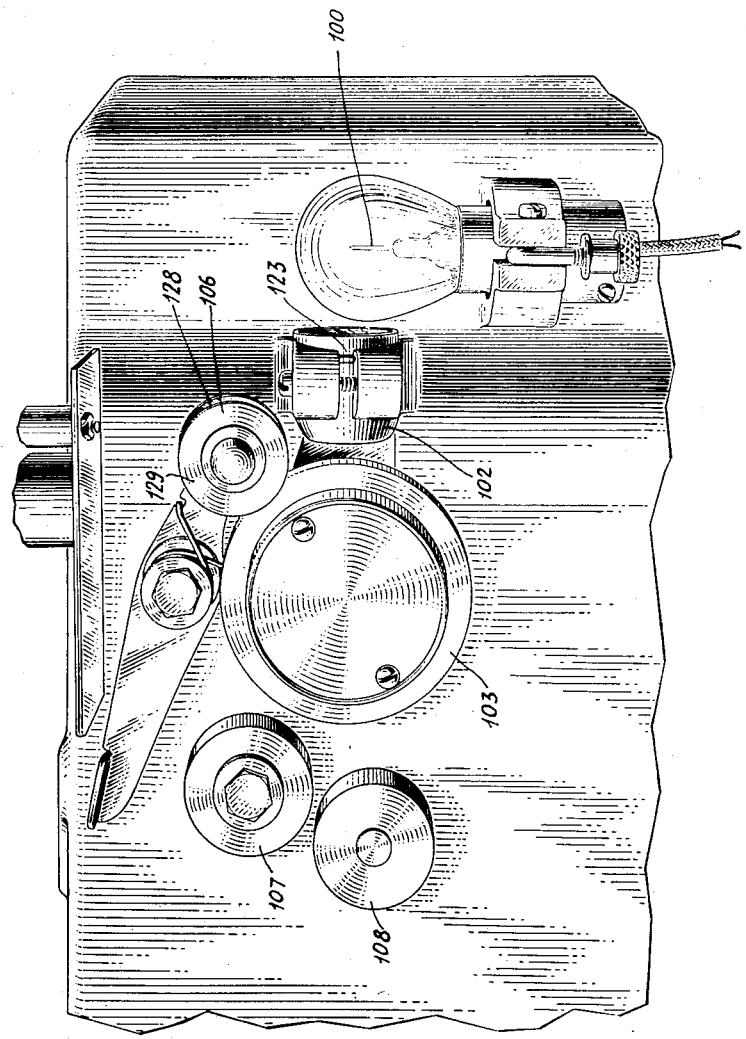
Figure 6:
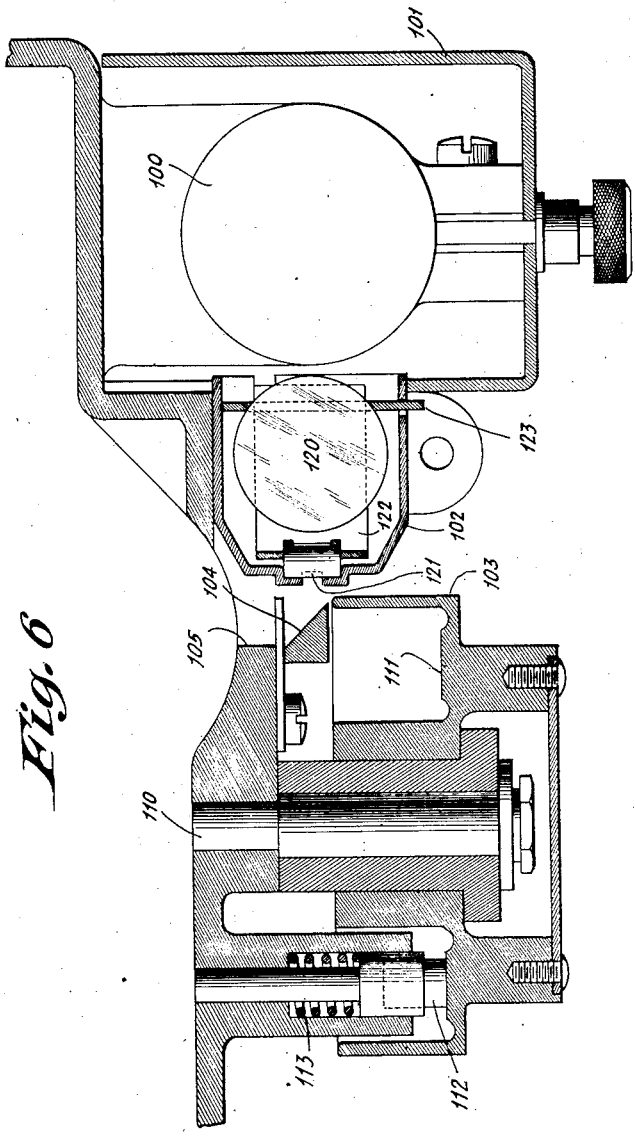
Figure 7:
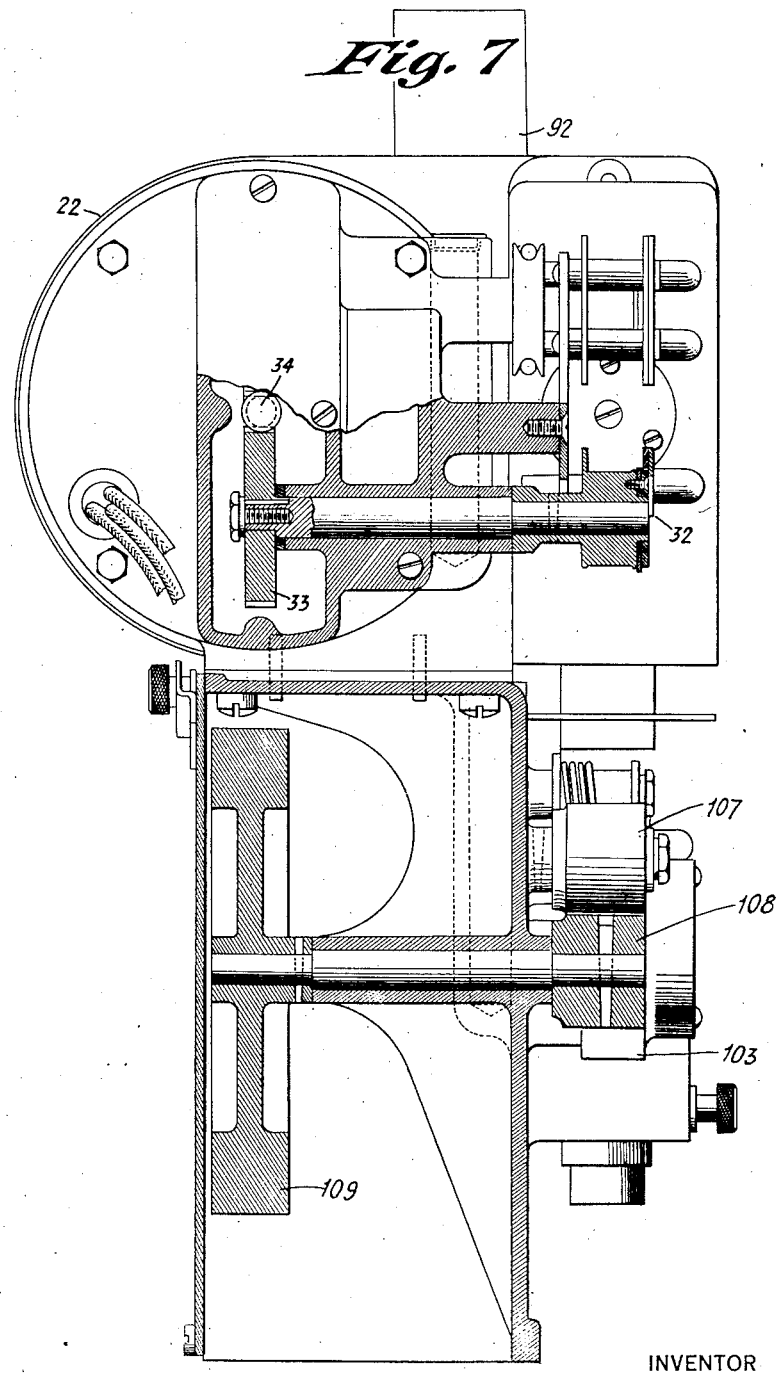
Figure 8:
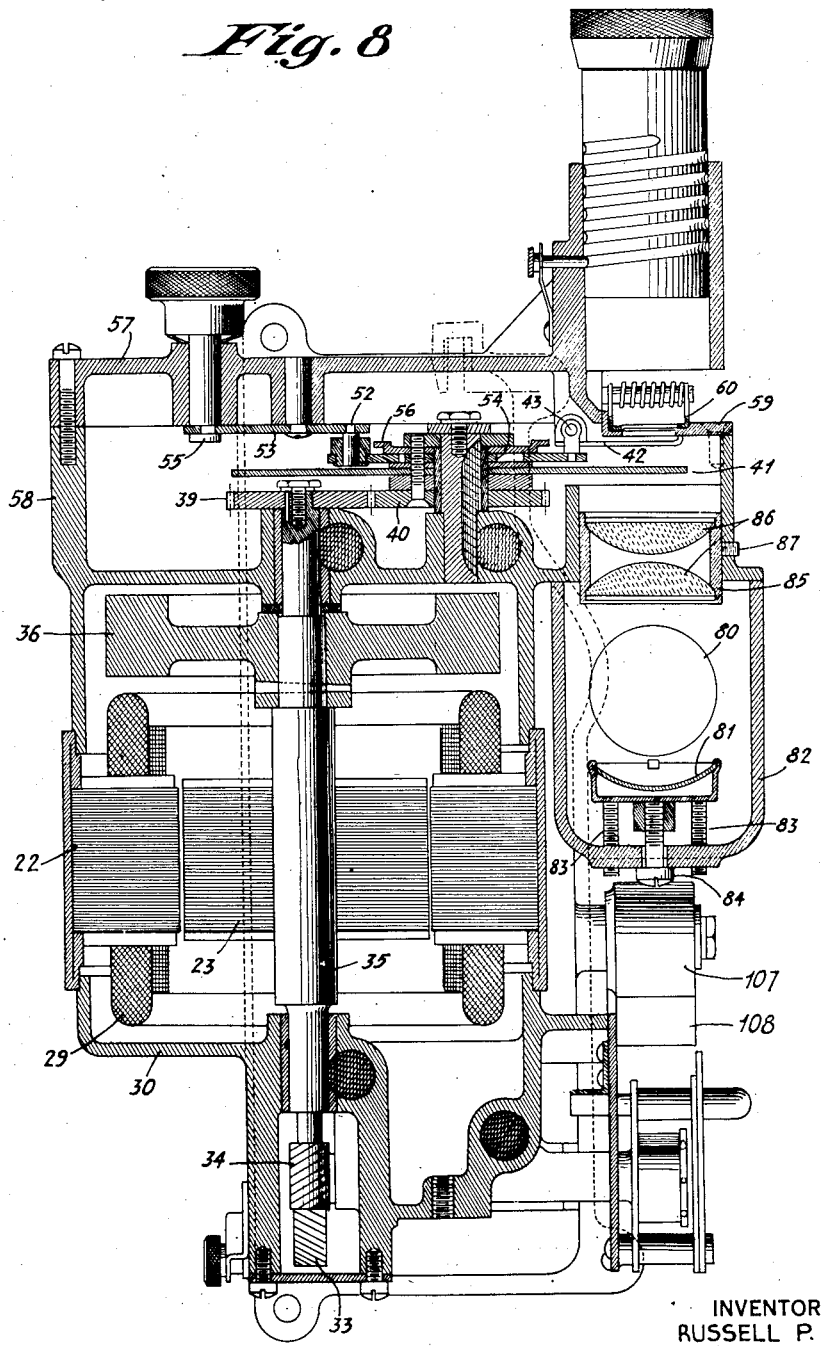
Figure 9:
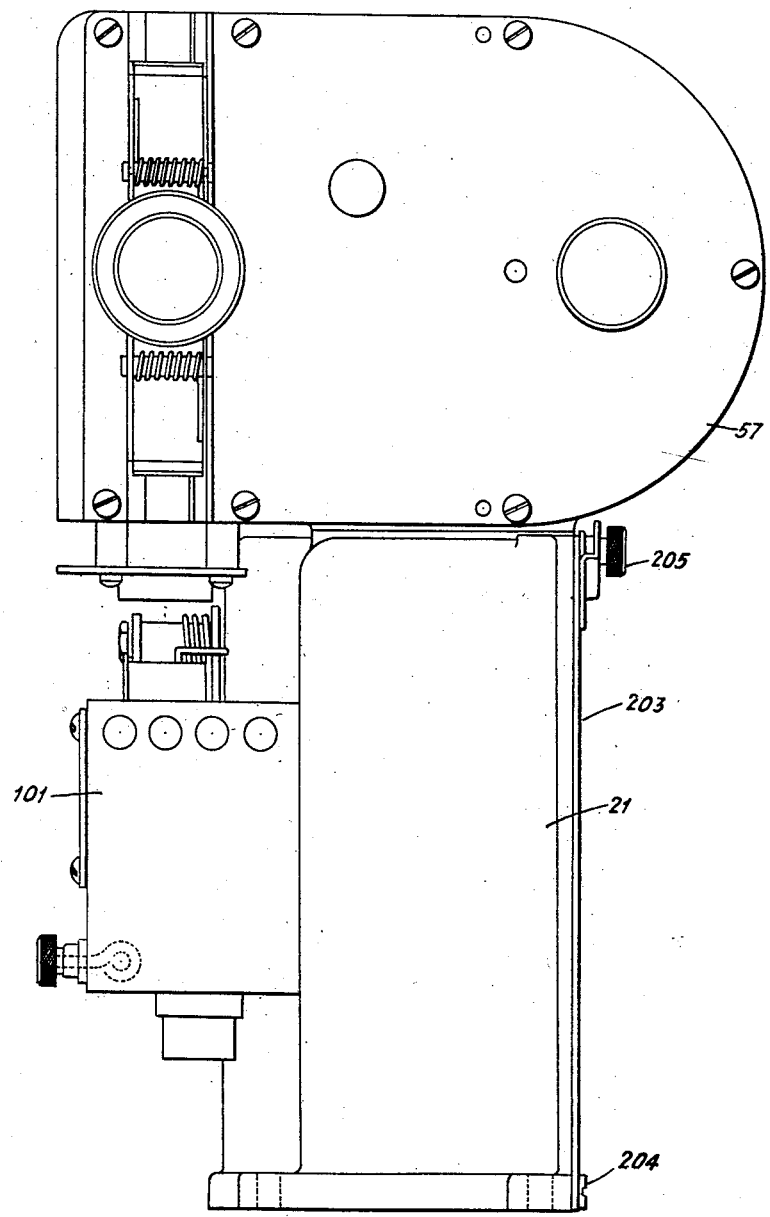
Figure 10:
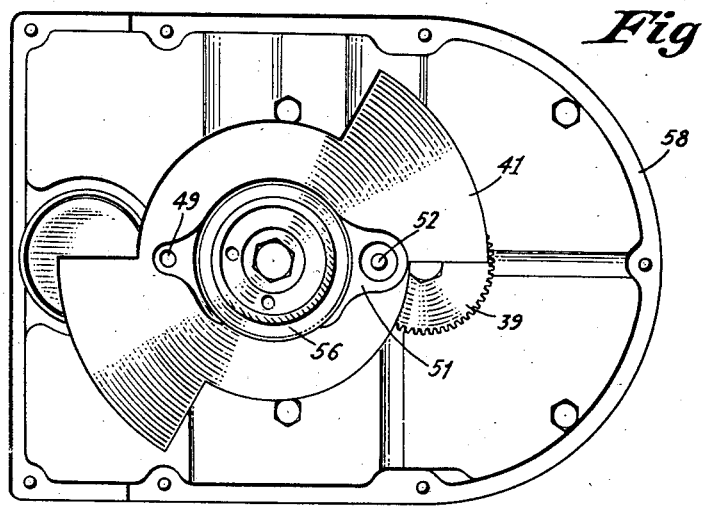
Figure 11:
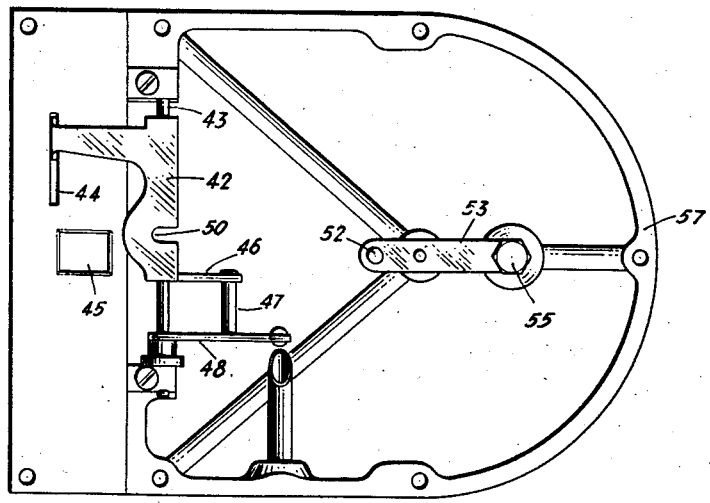
Figure 16:
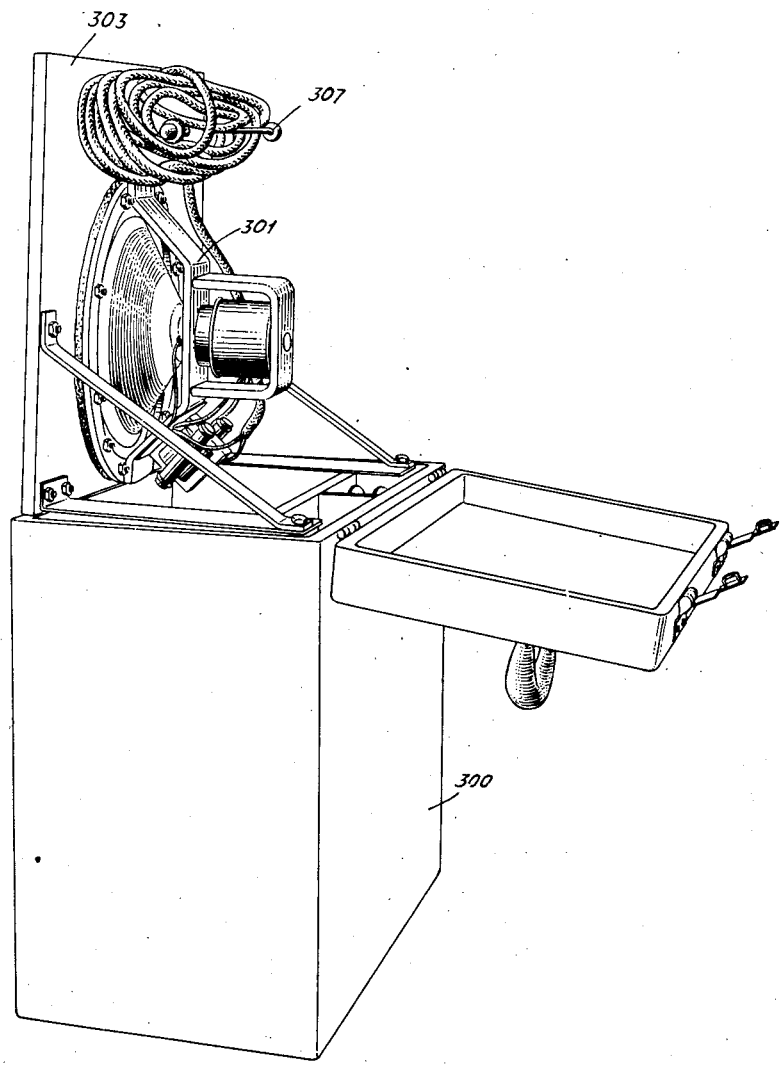
Figure 17:
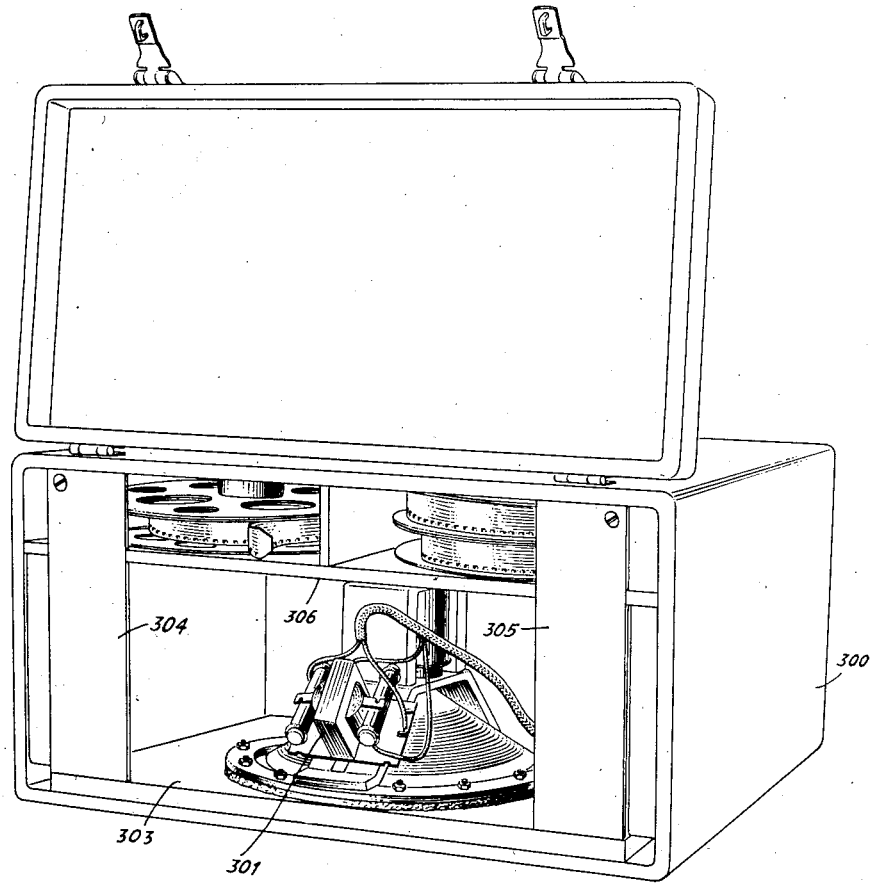
Figure 18:
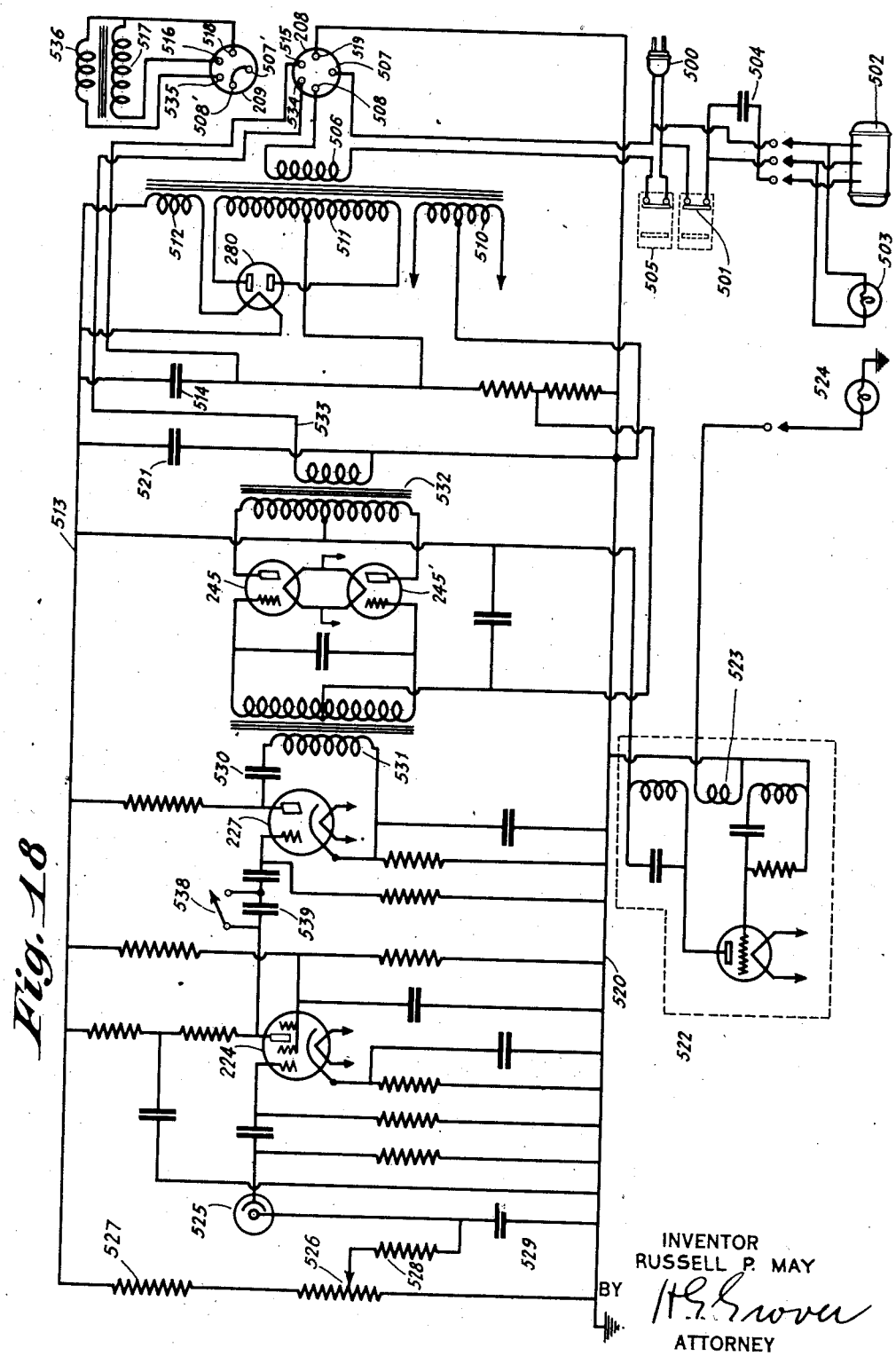
Figure 19:
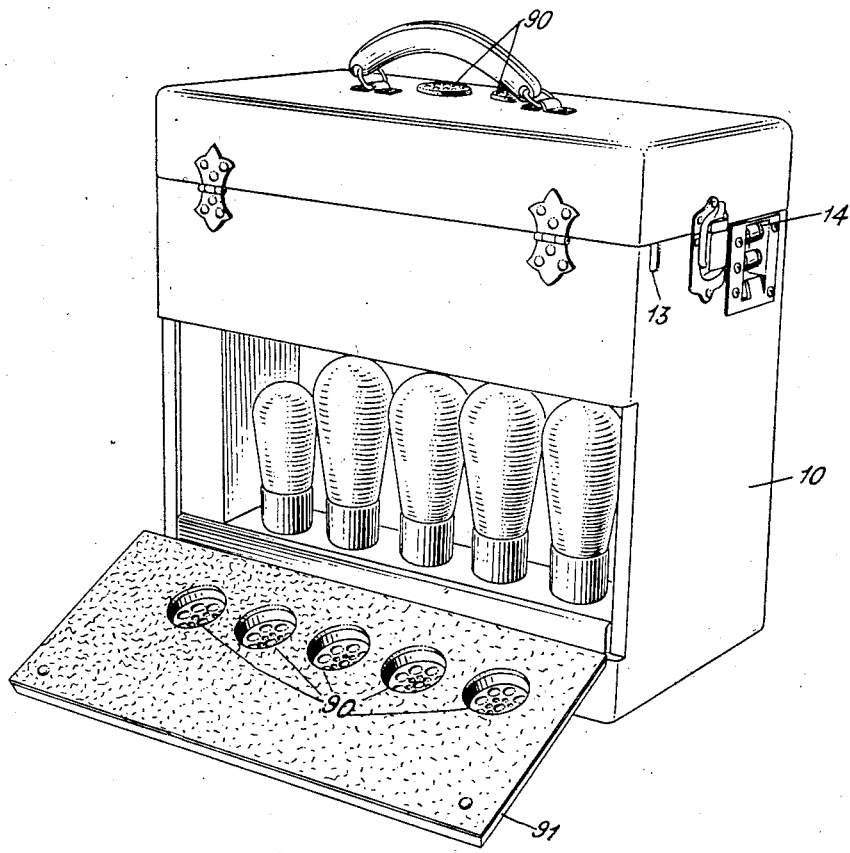

Fig. 4 is an elevation corresponding generally to Fig. 2 and indicating much of the interior construction of the device, Fig. 5 is an enlarged view of the sound take-off mechanism including the optical system and mechanism for carrying the film at this point, Fig. 6 is a longitudinal section along the axis of the optical system through the structure shown in Fig. 5, Fig. 7 is a view partly in section from the left-hand end of Fig. 2 or the righthand end of Fig. 3 showing the interior construction of the sprocket end of the projector mechanism, and of the soundhead, Fig. 8 is a horizontal section through the mechanism at the axis of the drive motor, Fig. 9 is an elevation of the projector mechanism from the righthand end of Figs. 1 or 2, or the lefthand end of Fig. 3, Fig. 10 shows the upper portion of the view corresponding to Fig. 9 but with the cover plate removed, Fig. 11 shows the cover plate as removed from Fig. 10 and shows the remainder of the mechanism of Fig. 10, this view being inverted in relation to Fig. 10 in order that the relation of the parts may be more apparent, Fig. 12 shows a modified form of film gate; and Figs. 13, 14 and 15 show details thereof, Fig. 16 shows the loudspeaker as set up for operation, Fig. 17 shows the loudspeaker as packed in its container along with the reels of film, Fig. 18 is the complete wiring diagram of the apparatus, and Fig. 19 shows the rear of the carrying case with the door providing access to the amplifier tubes open.

The film with which this projector is intended to cooperate is of the conventional 16 mm. width and is provided with pictures of exactly the same size as are ordinarily used on 16 mm. amateur film. The main difference from the usual amateur film is that one roll of sprocket holes is omitted and a sound-track preferably of the variable area type and approximately 6/100ths of an inch in width is located approximately where the row of sprocket holes would have been. Other differences are that the film is made to run at a speed of 24 frames or pictures per second which is the usual speed in talking motion pictures instead of 16 pictures per second which has heretofore been usual in 16 mm. films. The reason for this is that such pictures can be properly printed by projection when desired from standard theatre films or the equivalent without requiring that a special negative be taken and a special sound-track be made to be capable of reproduction in this apparatus.

The projector as shown in Fig. 1 is housed within a carrying case 10. This carrying case as indicated at 11 is lined with appropriate sound-absorbing material to absorb any noise which might be produced by the projector mechanism, the motor, or the fluttering of the film in order to avoid any disturbance of the audience, and is provided with suitable apertures for the lens as at 12, for the entrance and exit of wires as at 13, and for the entrance and exit of the film as at 14.

The case is also provided with ventilation apertures 90 in the front, back, and lid, and with a door 91 at the back which provides access to the amplifier tubes without removing the machine from its case. The front of the case opens downwardly to provide easy access to the film side of the machine for threading, etc.

Upon the outside of the carrying case are detachably mounted the film reel arms 15, the lower of which is driven by the belt 16 which passes over the rollers 17.

The loudspeaker cable is plugged into the base of the machine as indicated at 209, and when the case is closed and in operating condition passes out through the aperture 13.

After the film has been threaded with the case open, the case is closed and remains in closed position during operation, thereby retaining within the case not only the noise of the projector but also any stray light which may escape from the lamphouse.

The case is provided with a suitable leveling mechanism which may, for example, be a vertically slidable member retained by the set screw 18 or the member 18 may itself directly control an appropriate member for raising or lowering the front end of the case.

As shown in Fig. 2, the projector and attendant mechanism is mounted upon a base 20. This base is preferably, as shown, made from a bent sheet of metal and carries upon it the amplifier and photo cell in a manner analogous to that customary in the manufacture of radio sets. It also carries the projector and soundhead mechanism.

The projector and soundhead mechanism will be first described in detail and thereafter the related electrical mechanisms will be described.

Upon the base 20 is mounted an auxiliary base 21 which is made in the form of a casting securely attached to the base 20, and carries the soundhead mechanism and the motor 22.

This motor 22 is an essential portion of the projector mechanism, for it carries within its housing at one end the entire drive mechanism and bearings for the sprockets, and at the other end the intermittent feed and framing mechanism; it likewise serves to support at its side the sound exciter lamphouse and attendant optical system, at the front of which is built into the motor housing the film guides and lens mount. This motor includes a rotor 23 (Fig. 8) mounted within the stator structure 22 which is carried in the usual central casing, but in place of the usual end-bells are substituted special housings provided with appropriate bearings, etc. for the rest of the mechanism. The end-bell 30 at the lefthand side of Fig. 2 carries bearings for the shafts 31 and 32, and upon the inner ends of each of these shafts is mounted a gear as indicated upon the shaft 32 at 33 in Figs. 7 and 8. Both of these gears are driven by a gear 34 which is cut upon the one end of the rotor shaft 34. Immediately adjacent the other end of the rotor is mounted a flywheel 36 which serves to steady the rotation of the motor, and it will thus be apparent that the shafts 31 and 32, with their attendant sprockets 37 and 38, will be driven at a substantially uniform speed.

Within the other end-bell of the motor is mounted the intermittent feed mechanism and its framing mechanism.

This intermittent feed mechanism includes a gear 39 keyed upon the end of the rotor shaft which meshes with a gear 40 which is integral with the cam mechanism of the intermittent feed and with the shutter 41.

The intermittent feed is of the claw type and is best shown in Figs. 8, 10 and 11. The member 42 extends from the shaft 43 on which it is vertically slidable to and fro through the slot 44 which is beneath the aperture 45. This member 42 carries at its end and extending through the slot 44 claws which are adapted to engage and move the film. At its other end, this member bears the arm 46 extending outwardly into the casing and adapted to slide longitudinally along the pin 47 which is rigidly attached to the arm 48. A pin 49 cooperates with the aperture 50 in the member 42 to impart a vertical movement of the claw and this pin 49 is carried by the member 51 which is pivoted at 52 to the adjustable arm 53.

The arm 51 is provided with an aperture having parallel top and bottom within which the cam 54 is adapted to operate in order to move this arm and with it the feed claw vertically.

Framing is accomplished by moving the eccentric pivot 55 about its axis by means of the knob which is integral with this pivot member.

The in-and-out movement of the feed claw is accomplished by means of the cam 56 which acts upon member 48 and which, in turn, through its cooperation with the members 47 and 46 causes rotation of the member 42 about the shaft 43.

It will thus be apparent that the claw member 42 is moved up and down a predetermined distance and also moves in-and-out of the sprocket holes at the proper times and that adjustment of the position thereof at the times when the various phases of the movement will occur is readily effected by means of the eccentric 55.

It will be apparent from Figs. 8 and 11 that some portions of the mechanism just described are mounted upon the cover plate 57 while other portions are mounted upon the end-bell of the motor 58, but that these parts are so related that the unit may be easily assembled. One form of film gate is shown in Figs. 2, 4 and 8. In this form of gate there is a plate 59 attached to the motor housing in front of the optical system and shutter, and this plate has an appropriately surfaced channel in it to receive the film. Against this plate bears the pressure shoe 60 which is in the form of a pressed metal plate having appropriately formed contact surfaces for the film and having outwardly extending ears at the top and bottom, as shown, by which it may be grasped to open it. This gate is held in closed position by the springs 61 against the pressure of which it may be opened by grasping the ears above referred to and the elongated apertures in the sides of the gate which engage the pins 62 may then be slid down over the pins 62, retaining the gate in open position.

A modified form of gate is shown in Fig. 12 and this particular form of gate is found to be peculiarly effective when the film is drawn by traction of the intermittent feed on sprocket holes on one edge of the film only.

In this gate a backing plate 59 is provided as in the gate previously referred to, but the film is pressed toward this by a linear shoe 70. This shoe is provided with ears 71 which serve the same function as the ears above referred to and these ears are each provided with a notch 72 in their lower edges whereby the pressure shoe may be maintained in open position by drawing it outwardly and hooking these notches over the plates 73, which also serve as spring-retaining members.

The opposite edge of the film is prevented from fluttering by a guide 74 which extends the entire length of the gate but which, instead of being pressed firmly against the film by springs, is set at such spacing from the guide on the backing plate that the film can move freely therebetween. This avoids producing any tension on the edge of the film which is not drawn by the intermittent and at the same time, due to the small clearance (which may be of the order of two one-thousandths of an inch) and acting in cooperation with the pressure shoe at the other edge of the aperture, prevents any flutter of the film at the projection aperture.

The film is illuminated at the aperture by means of a light of the usual incandescent type diagrammatically indicated at 80, behind which is adjustably mounted a reflector 81 which is spaced from the lamp housing 82 by the screws 83, and is retracted against these screws 83 by the screw 84, there being three of the screws 83 as will be seen from Figs. 4 and 8 considered together.

In front of the lamp-housing 82 is mounted the condenser lens barrel 85 which contains the usual condenser lenses 86 and is maintained in proper adjustment by the set screw 87, all as shown in Fig. 8.

The top of the lamp-house is provided with a ventilating-flue 92 which serves to direct heated air from the lamp-house upwardly through openings 90 in the lid of the case. These openings are so positioned as to be immediately over the top of the flue 92 when the case is closed.

The cooling air is admitted through the other ventilating openings 99 in the front and back of the case. It will be apparent that on account of the larger number of openings most of the air enters around the amplifier tubes in the rear of the case and serves to first cool the amplifier tubes, which must operate at a relatively low temperature, and then passes to the bottom of the lamp-house and, passing upwardly therethrough serves to cool the projection lamp which operates at a higher temperature. A minimum quantity of air is accordingly required to adequately perform both cooling functions, and the structure is thus simplified. Further, the heat of the projection lamp itself provides sufficient draft to sufficiently cool both the lamp and the amplifier tubes.

It will be seen from Fig. 4 that the film passes over the top of sprocket 37 which draws the film from the upper or let-off reel and then passes in the form of a flat loop to the top of the gate 59 through which it is drawn by the intermittent feed mechanism already described and from which it passes in the form of another loop to the sound reproducing mechanism, which will be next described, and from thence it passes up to the sprocket 38, and then through another loop to the bottom of the sprocket 37 which serves as a hold-back sprocket for the lower reel.

The sound reproducing system, Fig. 5, is of the usual photoelectric type including a photoelectric cell, an exciter lamp, an optical system, and means for drawing the film through between the optical system and the photoelectric cell.

The exciter lamp of the present sound reproducer is indicated at 100 and is mounted within an adjustable socket within the casing 101. The light from this lamp passes through the optical system indicated generally at 102 which will be described in more detail later, and is focussed thereby upon the sound-track of the film which is carried on the surface of the drum 103, with the sound-track overhanging the inner edge of the drum. After passing through the film, the light strikes the reflecting surface 104 whence it is reflected through the aperture 105 to the photoelectric cell 200 located within the member 21.

The film is held against the drum 103 by an idler 106 which maintains the film firmly in engagement with the drum at this point. After passing around the drum for a sufficient distance to give good frictional contact, the film passes over the roller 107 and then around the roller 108, which latter roller is mounted on a shaft carrying at its other end the flywheel 109, and from this roller 108 the film then passes up over the sprocket 38 as before described.

The roller 108 is preferably sandblasted on its outer surface in order to provide adequate frictional contact within the small area. The action of the flywheel seves to prevent any irregularities being introduced into the motion of the film, whence the entire sound reproducing unit will operate in a uniform manner without any fluttering or variation in film speed.

The drum 103 is rotatable upon a shaft 110 as shown in Fig. 6. The interior of this drum is hollowed out and provided with a flat friction surface 111. Against this friction surface suitable pressure shoes 112 of which there may be three or more and which are preferably made of some such composition as oiled felt or leather, are pressed by the springs 113. It will be seen that the friction means 112 cooperating with the surface 111 produce a uniform braking action upon the drum and therefore cause the film to be firmly wrapped around both the drum and the succeeding two rollers. The braking action of the drum, by providing a constant impedance at this point, further prevents any tendency for the drum to oscillate back and forth about its axis, as would be the case to a certain extent if there were no braking or damping action.

The optical system generally indicated at 102 consists of a cylindrical lens 120 of fairly large diameter and having its axis vertical, i. e., parallel with the direction of the movement of the film and with the longitudinal axis of the sound-track, and of such focal length that light from the lamp 100 is focussed within the lens 121.

This lens 121 is likewise a cylindrical lens but is of very short focal length, the focal length in fact being so short that the errors normally existing in such a lens are negligible. The focal length of this lens is further so related to the vertical diameter of the luminous element of the lamp 100 that a linear image having the proper width will be formed transversely of the sound-track.

This lens 121 may be seated in a small depression in the face of the casing of the system and upon it rests the member 122 which member has a U-shape longitudinally, but with a depression in the bottom of the U to accommodate the lens 121 and hold it firmly in the depression of the casing. The two parallel sides of the U-shaped member have a spacing the same as the axial dimension of the lens 120 which is rendered parallel on the ends and have a depression to cooperate with the curved surface thereof, and the member 122 thereby maintains these two lenses accurately in perpendicular relation to each other. The member 122 passes through a slot in the member 123 and the lens 120 also passes through this slot and rests with its optically-surfaced portion against the ends of the slot.

The end of the member 123, which projects as illustrated, cooperates with a slot or keyway in the bracket 124 which is made integral with the member 21. It will be apparent that the surfaces of the lens 120 and therefore also the surfaces of the lens 121 will be maintained in a permanent alignment with relation to the frame of the machine, and if the keyway is properly positioned with relation to the longitudinal axis of the film, the line image above referred to will be accurately positioned transversely of the sound-track.

From the sound-track the light, of course, again diverges and it then strikes the reflecting surface 104 and, as before described, passes through the aperture 105 to the photocell which is mounted interiorly of the base 21.

The flange 128 of the pressure-roll 106 is fixed, whereas the flange 129 is pressed against the film by a spring, thereby holding the sound-track edge of the film firmly against the flange 128 and accurately fixing the location of the sound-track in relation to the reproducer.

The photocell 200, being rather sensitive to jars and vibration, is mounted on an appropriately cushioned socket, and in the present case it is preferable to do this by a spring mounting underneath the base of the apparatus, the spring mounting carrying the rods 201 supporting the photocell socket and also the socket for the amplifying tube 224, which is the first amplifier tube following the photocell and is preferably of the screen-grid type. This integral mounting of the photocell and amplifier tube prevents any relative oscillation of the grid lead to the said tube, and thereby tends to reduce noise. Within the same portion of the casing are also mounted the condensers 202 and the flywheel 109, and this portion is closed by a cover as shown at 203 in Fig. 9 which slides over the screws 204 and is retained in position by the screws 205, thus providing a light-tight housing for the photocell and at the same time electrically and magnetically shielding both the photocell and high-gain amplifying tube.

The power transformer is located at 206 and feeds a rectifier tube indicated at 280 for supplying plate current for the amplifier tubes, which is filtered through the condenser 202 and an appropriate choke which, in the present instance, is also used as the field magnet of the dynamic speaker. The remainder of the amplifier tubes are mounted along the back edge of the base, the sockets being attached to the lower section of the base and all of the wiring being contained thereunder, the connections thereof being described later in connection with Fig. 18.

The socket 208 at the front of the base in Fig. 2 is adapted to receive the loudspeaker plug 209 with which it cooperates in a manner hereinafter described under the description of Fig. 18.

Having described the mechanical construction of the projector and sound reproducer, I now describe the mechanical construction of the loudspeaker which it is preferred to use therewith.

A suitable carrying case 300 preferably more or less similar in size and general appearance to the carrying case 10 for the projector is provided.

The interior of this case is provided with two or more compartments for film reels which will usually include an empty reel or such other reels as may be desired. The remainder of the space of this carrying case is occupied by the loudspeaker itself which consists of a usual type of dynamic speaker generally indicated at 301 and the field magnet of which is so wound as to properly serve both that purpose and the purpose of a filter choke in the power supply. This loudspeaker is mounted on a baffle board 303, as is usual with such speakers, and the baffle board is made slightly less in dimension than the carrying case in order that the entire speaker and baffle board may be included into the carrying case as shown in Fig. 17.

At the bottom of the baffle board are attached the arms 304 and 305 which are adapted to fit into appropriately shaped notches in the top of the partition 306; these arms being of such length that they also fit within the carrying case when the loudspeaker is in the inverted position.

When the apparatus is open for operation, the bottom edge of the baffle board sits on the top edge of the front of the carrying case, which then also serves as a portion of the baffle, and the arms 304 and 305 again fit into the notches in the partition 306, thus preventing displacement from its position.

Inasmuch as a considerable length of flexible cable is necessary to carry current to and from the speaker, I provide at the rear of the baffle board a pair of arms 307 upon which this cable may be wound, thus permitting the speaker to be removed bodily from the carrying case without appreciable difficulty and without any chance of entangling this cable which carries at its other end the plug 209 before referred to.

I may fix the loudspeaker permanently in the carrying case, and provide an appropriate aperture for the emission of sound, but in such a construction I likewise provide compartments to receive the film reels.

The electrical connections of the apparatus, as illustrated in Fig. 18, are next described:

Alternating current preferably at 110 volts and 60 cycles is introduced through the conventional attachment plug 500, and the circuit from this line is divided.

One circuit passes through the switch 501 to the motor 502 and the projection lamp 503. These are connected in parallel so that the projection lamp will not operate unless the motor is run, thereby avoiding the necessity for a fire shutter. The motor, being of the split-phase type, is provided with the condenser 504 in one of its circuits.

The other circuit passes through the switch 505 to the primary transformer winding 506 but, in order to safeguard the filter and amplifiers, it is connected thereto through the terminals 507 and 508 of the receptacle 208. These terminals cooperate with terminals 507' and 508' of the plug 209 which latter terminals are connected together. It will be apparent that the circuit from the 110 volt line through the primary 506 of the power transformer is not closed unless the loudspeaker plug 209 is in the receptacle 208 and the high voltage current from the amplifier circuit is thereby permitted, as later described to flow through the field winding 517 of the loudspeaker.

The power transformer is provided with three windings, a winding 510 which provides the proper voltage for the filaments or heaters of the various tubes, preferably about 2½ volts, a winding 511 which provides the necessary high voltage for the plate current, and a winding 512 which serves to heat the filament of the rectifier tube 280.

The filter circuit is of a conventional type, the cathode of the tube 280 being connected directly to the line 513 which transmits the plate current to the various tubes of the amplifier and the plates of tube 280 being connected to the ends of the center-tapped winding 511 which provides the high voltage current. From the winding 512 current flows through the various tubes to the line 520 and then to the connector 519 of the receptacle 208 which cooperates with the connector 518 of the plug 209 to feed the current to the field winding 517 of the speaker returning first through the contacts 516 and 515 to the center-tap of the high voltage winding. Condensers 514 and 521 are connected from line 513 to each terminal of the field winding respectively, the values of these two filter condensers being of the order of 10 microfarads. Part of the current flowing through line 520 is divided and returns directly to 511 center-tap through resistance R, the IR drop being used for grid bias of tubes 245.

The heater circuits of the various tubes are not shown directly, it being obvious that the indicated leads thereof will be connected to the winding 510.

An oscillator circuit indicated generally by the portion of the diagram designated as 522 is connected to the power supply just described. This oscillator circuit is of the conventional type illustrated but may, of course, be any equivalent oscillatory circuit and the output thereof which is picked up by the coil 523 is fed to the exciter lamp 524. The frequency of this oscillator is made sufficiently high so that there is no appreciable change in filament temperature during the period of oscillation, and an A. C. hum due to change in filament temperature of the exciter lamp is thereby avoided. It should be noted that it is unnecessary for the frequency of the oscillator to be above audible frequency so long as it is sufficiently high to avoid a material change in filament temperature during the half-period of oscillation, and this length of time is determined by the characteristics of the exciter lamp used, a thicker filament permitting a lower oscillating frequency than a thin one. In view of this, the frequency should be chosen with due regard to cost of the oscillator, the space required by it, and the characteristics available of the exciter lamps.

From the exciter lamp 524 light, as hereinbefore described, is transmitted through the film to the photocell 525.

This photocell is supplied with the proper voltage through the potentiometer 526 which acts in conjunction with the resistors 527 and 528, these resistors being bypassed by the condenser 529. The cathode of the tube 525 is connected to the grid of the first amplifier tube 224 in a manner analogous to that shown in Langmuir Patent 1,223,627. The tube 224 is preferably of the indirectly-heated screen grid type having a high voltage-amplification and is resistance coupled, in the conventional manner illustrated, to the tube 227 which is connected through the capacity 530 to the push-pull transformer 531. This transformer is connected to the grids of the tubes 245 and 245' in the usual push-pull manner, these tubes being appropriate "power" tubes and having sufficient output to properly operate the loudspeaker, and the plates of these tubes are connected through the transformer 532 to the line 533 leading through the connections 534 and 535 to the voice coil 536 of the dynamic speaker, returning to the transformer 532 through the connections 518 and 519 and the line 520 to ground and to the filaments of the tubes 245 and 245'.

It will be apparent that I have provided a complete amplifier which is capable of very compact and light construction and at the same time capable of a large voltage gain and power output, and therefore particularly adapted for this type of apparatus.

The volume is controlled by controlling the voltage of the photocell 525 by means of the potentiometer 526 and the tone can be varied by operation of the switch 538 which serves to short-circuit the condenser 539.

One of the important details is the connection of the power supply through the plugs 208 and 209 for safeguarding the amplifier.

The apparatus described is not only compact and portable but produces a quality of picture and sound reproduction comparable with that of the large and expensive equipment using "standard" film.

I claim:

1. A combined carrying case and housing for a talking motion picture apparatus including means for holding a double reel support externally of said carrying case, idler rollers in said carrying case for guiding the film from one of said reels to said projector and from said sound reproducer to the other of said reels, and idlers coaxial therewith for supporting a belt to drive the second of said reels.

2. A combined carrying case and housing for a talking motion picture apparatus consisting of a sound-proof box having an aperture therein for the emission of a beam of light to project pictures, and a slot in a wall of said case and having its end closed by the cover of said case for receiving wires leading to and from the apparatus while in operation, whereby said wires may be removed from said slot and placed entirely within said case when the cover is open.

3. Talking motion picture machine adapted to operate with picture film having a sound-track thereon comprising a motor having a shaft and an armature, a flywheel mounted on said motor shaft, intermittent film feed mechanism for picture projection mounted upon and driven by one end of said motor shaft, and a constant-speed sprocket for drawing the film through the sound reproducer driven from the other end of said motor shaft whereby irregularities of motion tending to be produced by the intermittent feed mechanism are prevented from affecting the constant-speed sprocket.

4. Talking motion picture apparatus comprising a main driving shaft having a flywheel thereupon, a worm upon said main driving shaft, a worm-wheel engaging said worm for feeding the film to a projection point, and a second worm-wheel independently engaging said worm and driving a second sprocket for feeding the film through a sound reproducing apparatus, the film passing from said second sprocket to said first sprocket and thence to the take-up reel whereby irregularities of motion imparted to the film at the projection point are prevented from reaching the said second sprocket, and irregularities in the motion of the take-up reel are likewise prevented from reacting upon said second sprocket.

5. Talking motion picture apparatus comprising a main driving shaft having a flywheel thereupon, an irreversible worm upon said main driving shaft, a worm-wheel engaging said irreversible worm for feeding the film to a projection point, and a second worm-wheel independently engaging said irreversible worm and driving a second sprocket for feeding the film through a sound reproducing apparatus, the film passing from said second sprocket to said first sprocket and thence to the take-up reel whereby irregularities of motion imparted to the film at the projection point are prevented from reaching the said second sprocket, and irregularities in the motion of the take-up reel are likewise prevented from reacting upon said second sprocket.

6. Combined motion picture and sound reproducing apparatus comprising a main drive shaft having a momentum member thereon, an irreversible worm upon said drive shaft and separate means driven independently by said worm for driving the motion picture apparatus and sound reproducer, whereby irregularities in the motion of the motion picture apparatus are prevented from affecting the motion of the sound reproducer apparatus.

7. Combined motion picture and sound reproducing apparatus comprising a main drive shaft having a momentum member thereon, an irreversible worm upon said drive shaft adjacent one end thereof and separate means driven independently by said worm for driving the motion picture apparatus and sound reproducer, and independent means for driving the intermittent feed mechanism of the motion picture apparatus from the other end of said drive shaft, whereby irregularities in the motion of the motion picture apparatus are prevented from affecting the motion of the sound reproducer apparatus.

8. A loudspeaker case for portable talking motion picture apparatus comprising a box having a removable cover, a baffle board adapted to mount a loudspeaker and having a pair of brackets extending from its rear face, and means in said box for supporting said baffle board in an inverted position within said box or for supporting said baffle board and said brackets in an upright position above said box whereby the front of said box is contiguous to and forms a continuation of said baffle board.

RUSSELL P. MAY.